Patented Aug. 18, 1953

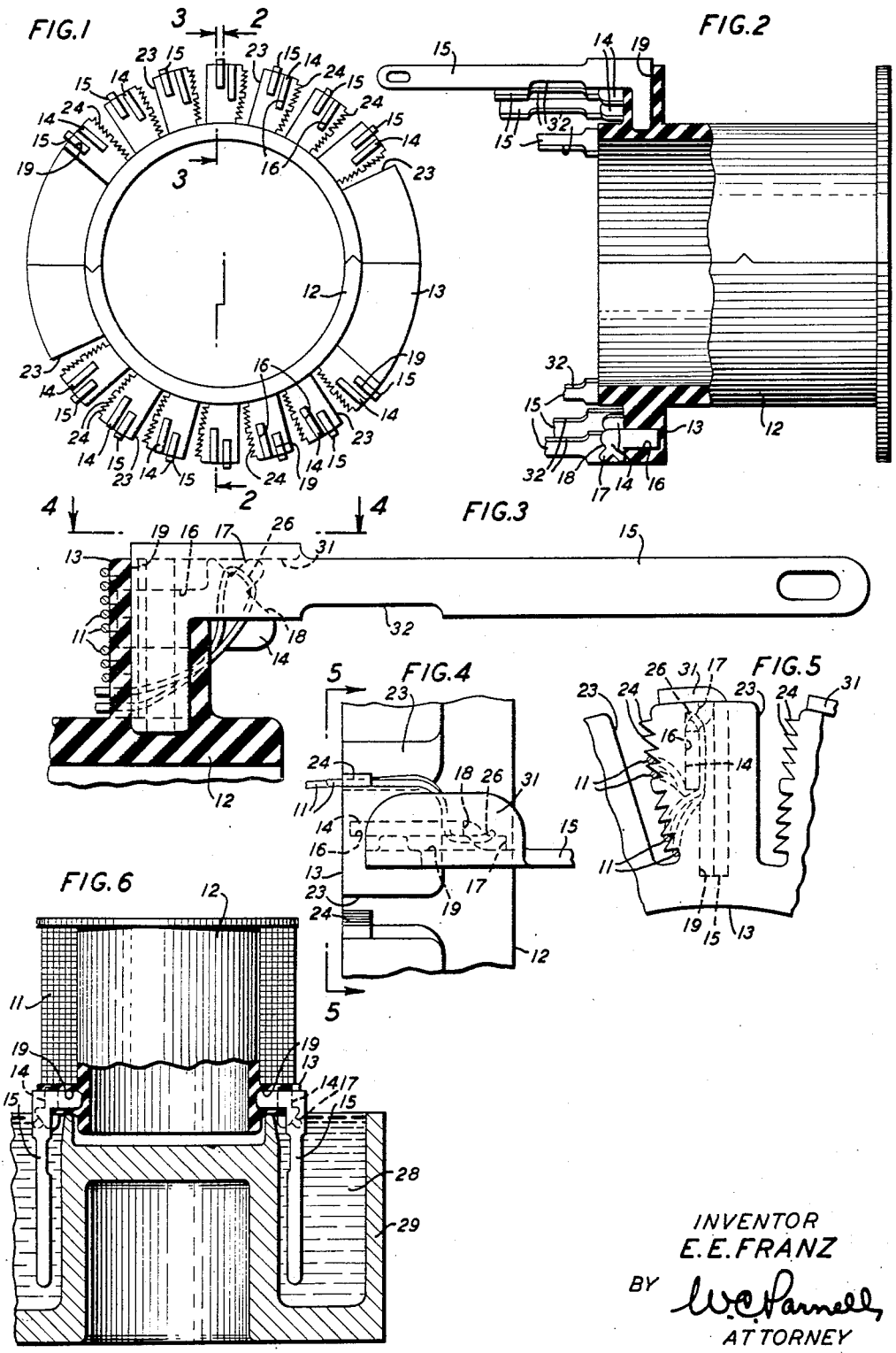

2,649,558

UNITED STATES PATENT OFFICE 2,649,558

MOUNTING HEAD FOR COIL TERMINALS

Erwin E. Franz, Cranford, N. J., assignor to Western Electric Company, Incorporated, New York, N. Y., a corporation of New York Application June 9, 1949, Serial No. 97,973

3 Claims. (Cl. 317—220)

This invention relates to electrical terminals, and more particularly to a terminal structure especially adapted for use with electrical coils.

In the case of coils of conductive wire which are wound upon a core of magnetic material, it is often desirable to tap the coil winding and bring out leads to suitable terminals so that portions of the winding other than the whole may be utilized for the particular electrical purpose in mind. For example, the secondary winding of a transformer is often tapped to provide a voltage source smaller than the normal secondary voltage. The conventional manner of tapping into coil windings and bringing out leads therefrom has been to interrupt the winding process when the desired point has been reached, skin the insulation from the wire at that point to lay the conductor bare, connect a lead wire to the skinned portion of the main conductor, and cover the spliced joint with some form of insulating tape. The lead wire is then passed out of the coil to be connected to a terminal. In so bringing the lead out its position is transverse to the coil wire, and the pressure of subsequent winding of the coil greatly compresses the insulation of the lead wire, leading to frequent short circuits. In addition, leads of small diameter are easily broken, while those connecting to coil wire of large diameter must usually consist of several wires to provide the flexibility necessary for connecting purposes. The bulkiness incident to this conventional method of tapping also militates against the evenness of the rows of the wound coil and causes bunching of adjacent wires in a manner conducive to causing short circuits and other defects.

A further disadvantage of the present method is that the level of the leads is not controlled as they are brought out, and where a plurality of leads are tapped into the coil at different levels, the leads bear on and rub against the end loops of the coil in going to the connecting terminals, which is still another potential source of short circuits. Lastly, an appreciable time is required to tap into a coil in the manner just described. The method does not lend itself to mass production, and its use greatly increases the time required in the manufacture of coils having tapped windings.

It is therefore an object of this invention to enable connections to be made to any desired part of an electrical coil in a minimum of time and in a manner which will not be conducive to causing defects in the coil.

This object is accomplished according to the invention by providing a spool on which an electrical coil has been wound with a plurality of radial slots having serrated sides. Parts of the coil winding to be tapped are brought out in the form of loops, which are passed over appropriate serrations to maintain their correct levels. The loops make contact with and are soldered to terminals adjacent to each slot.

Other objects and advantages will be apparent from the following detailed description taken in conjunction with the attached drawing in which:

Fig. 1 is an end view of the proposed terminal structure;

Fig. 2 is a side view of the terminal structure and winding spool, taken partly in section along the line 2—2 of Fig. 1;

Fig. 3 is an enlarged view of a terminal assembly, taken along the line 3—3 of Fig. 1;

Fig. 4 is another view of a terminal assembly, taken along the line 4—4 of Fig. 3;

Fig. 5 is a view of the manner in which the coil leads are positioned on the serrated edges, taken along the line 5—5 of Fig. 4;

Fig. 6 is a sectional view of a cylindrically shaped solder pot showing the entire terminal structure immersed therein for mass soldering.

With reference to the drawing, a coil of conductive wire 11 is shown as wound about a spool 12, the winding being accomplished by any suitable method. One end of the spool 12 has an insulating member generally designated as 13 on which the proposed terminal structure is mounted. The terminal structure contains primarily two types of terminals, stub terminals 14 and long terminals 15. The stub terminals 14, which have a contour as shown in Figs. 2 and 3, are firmly mounted in any convenient manner in recesses 16 located at spaced intervals in the insulating member 13. These terminals are inserted prior to the winding of the coil on the winding spool, but are not affected by the rotation of the spool incident to the winding operation since they are mounted in a plane parallel to the axis of rotation. If desired, these stub terminals may be molded as an integral part of the member 13 as an alternative to the mounting method just described. The terminals 14 have a curved projection 17 extending from its surface 18, the projections being used to secure the loops of wire as hereafter explained.

The long terminals 15 are similarly fitted into recesses 19 of the insulating member 13, but are not mounted until after the coil 11 has been wound upon the spool as otherwise the spool would not be able to rotate in a circumscribed space. The long terminals 15 are inserted into the recesses 19 in a direction at right angles to that in which the stub terminals 14 are inserted. This enables the terminal assembly, when soldered together, to remain firmly in position, and to resist movement from any direction which would tend to jar it loose from its mounting. The contour of the long terminals 15 is shown in Figs. 2 and 3.

The insulating member 13 contains a plurality of radial slots 23 which may be given any desired spacing around the periphery of the insulating member. Each of the radial slots 23 has one side serrated as shown in Fig. 1. As will be seen from the drawing, these serrations form a plurality of miniature surfaces 24 which are generally parallel to the axis of rotation of the spool 12. The serrations in each of the sides of slots 23 are divided into two groups, those of the upper group having their surfaces 24 facing the exterior of the spool, while those of the lower group have their parallel surface 24 facing the interior of the spool. The purpose of this arrangement of serrations is to allow leads from all levels of the coil to be brought into a normal position for mounting on the stub terminals, as shown in Fig. 5.

In practicing the invention, the part of the coil winding which is to be tapped is usually brought out from the coil in the form of a loop 26 which is fed through the slot 23 which corresponds to it in position and is then passed over the particular surface 24 in the serrated side of the slot which has a level most closely corresponding to that of the loop. The loop is thus maintained at its correct level position upon leaving the coil, and is prevented from coming into engagement with other wires at that end of the coil, thus eliminating the possibility of short circuits. The loops are then skinned and are passed over the projections 17 of the stub terminal 14, as shown in Figs. 3, 4 and 5. If one of the coil ends rather than a loop is to be attached to the terminal, it is wrapped around and fastened to the projection 17. The parts of the loop leading from and back to the coil are protected by adhesive insulating tape or similar means from coming into contact with preceding or succeeding layers of the coil winding while these parts are in their transverse position relative to the winding. When all of the loops to be tapped are brought out in the foregoing manner and placed over the projections 17 of the various stub terminals, the long terminals 15 are inserted into position in recesses 19. As will be seen from the drawing, each set of terminals is positioned with respect to each other so that the loops lie in the narrow space between the two terminals with their ends anchored to the projections 17. While in this position each terminal assembly thus formed may be soldered to form a solid, compact joint. This may be done individually, or all of the terminal assemblies may be soldered in one operation, as shown in Fig. 6, by immersing the end of the spool having the terminal structure in a pool of solder 28 contained in solder pot 29.

The long terminals 15 are provided with a lip 31 and a reduced portion 32, which insures that the long terminal will be weaker at the section containing the reduced portion than at the mounting end containing the lip. This means that any external force accidentally striking the long terminals will cause the terminal to bend at its reduced portion before damage can be done to the soldered joint of the two terminals and the tapped loop.

The use of a terminal structure as herein described insures the correct positioning of leads as they are brought out to be connected to terminals, and helps to eliminate short circuits and other damage to the leads which would occur if they were not correctly positioned. In addition, loops may be brought out and tapped according to the present invention in a much shorter time than would be possible where tap leads are spliced to the coil and soldered to terminals individually, as the proposed terminal mounting method can be done rapidly and lends itself readily to mass soldering.

Although applicant's terminal structure has been described with particular reference to coils wound on a round spool, the invention is of equal application to coils wound on square or rectangular spools, as the same need for maintaining the correct level for loops during the mounting procedure exists on square or rectangular spools, and the invention can be easily adapted for use with these types. The proposed terminal structure may also be incorporated into a washer shaped piece, which would then be mounted in position over a core to be wound.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A head member for use with a longitudinal core on which a coil of wire is to be wound, the member having a shape which conforms to the cross section of the core and being adapted to be mounted at one end thereof, said head member containing terminal members for attaching leads from the coil at an intermediate level, a plurality of slots generally perpendicular to the outer periphery of the head member to allow passage of the leads from the coil to the terminal members, at least one of the side surfaces defining each slot having an upper and a lower group of "V" shaped serrations, each serration having one surface generally parallel to the said outer periphery, the parallel surfaces of the upper group facing the outer periphery and those of the lower group facing in the opposite direction, thereby enabling the leads to maintain the level at which they leave the coil by being supported in serrations at substantially that level and to be brought to the terminal members at the intermediate level.

2. A head member for use with a longitudinal core on which a coil of wire is to be wound, the member having a shape which conforms to the cross section of the core and being adapted to be mounted at one end thereof, said head member containing short stub terminal members for attaching leads from the coil at an intermediate level, a plurality of slots generally perpendicular to the outer periphery of the head member to allow passage of the leads from the coil to the terminal members, at least one of the side surfaces defining each slot having serrations, thereby enabling the leads to maintain the level at which they leave the coil by being supported in the serrations at substantially that level and to be brought to the terminal members at the intermediate level, and slots adjacent to the short stub terminal members for receiving long extension terminal members.

3. A head member for use with a longitudinal core on which a coil of wire is to be wound, the member having a shape which conforms to the cross section of the core and being adapted to be mounted at one end thereof, said head member containing short stub terminal members for attaching leads from the coil at an intermediate level, a plurality of slots generally perpendicular to the outer periphery of the head member to allow passage of the leads from the coil to the terminal members, at least one of the side surfaces defining each slot having an upper and a lower group of "V" shaped serrations, each serration having one surface generally parallel to the said outer periphery, the parallel surfaces of the upper group facing the outer periphery and those of the lower group facing in the opposite direction, thereby enabling the leads to maintain the level at which they leave the coil by being supported in serrations at substantially that level and to be brought to the terminal members at the intermediate level, and slots adjacent to the short stub terminal members for receiving long extension members.

ERWIN E. FRANZ.

References Cited in the file of this patent

UNITED STATES PATENTS

| Number | Name | Date |
|---|---|---|
| 1,014,780 | Smith | Jan. 16, 1912 |
| 1,122,290 | Mack | Dec. 29, 1914 |
| 1,639,310 | Richardson | Aug. 16, 1927 |
| 1,753,639 | Bagdley | Apr. 8, 1930 |
| 1,823,827 | Franz | Sept. 15, 1931 |
| 1,888,275 | Larsen | Nov. 22, 1932 |
| 1,888,288 | Purdy | Nov. 22, 1932 |
| 1,968,600 | Driftmeyer | July 31, 1934 |
| 1,984,036 | Schwartzmann | Dec. 11, 1934 |
| 2,166,841 | Helgason | July 18, 1939 |
| 2,339,054 | Craddock et al. | Jan. 11, 1944 |
| 2,459,943 | Jauss | Jan. 25, 1949 |
| 2,471,869 | Gebel | May 31, 1949 |
| 2,486,751 | McMichael | Nov. 1, 1949 |

FOREIGN PATENTS

| Number | Country | Date |
|---|---|---|
| 398,146 | Great Britain | Nov. 30, 1931 |